(12) United States Patent
Kamen et al.

(10) Patent No.: US 6,862,883 B2
(45) Date of Patent: Mar. 8, 2005

(54) REGENERATOR FOR A STIRLING ENGINE

(75) Inventors: Dean L. Kamen, Bedford, NH (US);
Christopher C. Langenfeld, Nashua, NH (US); Kingston Owens, Bedford, NH (US); Jonathan Strimling, Bedford, NH (US)

(73) Assignee: New Power Concepts LLC, Manchester, NH (US)

( * ) Notice: Subject to any disclaimer, the term of this patent is extended or adjusted under 35 U.S.C. 154(b) by 0 days.

(21) Appl. No.: 10/612,185

(22) Filed: Jul. 2, 2003

(65) Prior Publication Data

US 2004/0003591 A1 Jan. 8, 2004

Related U.S. Application Data

(60) Division of application No. 09/818,321, filed on Mar. 27, 2001, now Pat. No. 6,591,609, which is a continuation-in-part of application No. 09/517,245, filed on Mar. 2, 2000, now Pat. No. 6,381,958, which is a continuation-in-part of application No. 09/115,383, filed on Jul. 14, 1998, now Pat. No. 6,062,023, and a continuation-in-part of application No. 09/115,381, filed on Jul. 14, 1998, now abandoned.
(60) Provisional application No. 60/052,535, filed on Jul. 15, 1997.

(51) Int. Cl.$^7$ .............................................. F01B 29/10
(52) U.S. Cl. ......................................... 60/526; 165/10
(58) Field of Search ............................ 165/10; 60/526, 60/527

(56) References Cited

U.S. PATENT DOCUMENTS

| | | | |
|---|---|---|---|
| 2,564,100 A | 8/1951 | du Pré | |
| 3,742,578 A | 7/1973 | Dirne et al. | |
| 3,782,457 A | 1/1974 | Troy | |
| 3,849,101 A * | 11/1974 | Wythe et al. | .................. 65/355 |
| 3,991,586 A * | 11/1976 | Acord | .............................. 62/6 |
| 4,041,592 A | 8/1977 | Kelm | |
| 4,172,363 A | 10/1979 | Bex | |
| 4,191,241 A | 3/1980 | Brennan | |
| 4,327,550 A * | 5/1982 | Knoos | .......................... 60/522 |
| 4,416,114 A | 11/1983 | Martini | |
| 4,532,765 A * | 8/1985 | Corey | .......................... 60/517 |
| 5,069,272 A * | 12/1991 | Chagnot | ......................... 165/8 |
| 5,161,374 A * | 11/1992 | Schiessl | ........................ 60/526 |
| 5,675,974 A | 10/1997 | Heidkrodt et al. | |
| 5,743,091 A * | 4/1998 | Penswick et al. | .............. 60/517 |
| 6,347,453 B1 | 2/2002 | Mitchell | |
| 6,397,636 B1 * | 6/2002 | DiGiovanni et al. | ........... 65/395 |

FOREIGN PATENT DOCUMENTS

| | | | |
|---|---|---|---|
| DE | 39 34 545 A 1 | 5/1991 | |
| DE | 295 20 864 U 1 | 5/1996 | |
| JP | 58117995 | 7/1983 | |
| JP | 63068759 A * | 3/1988 | ........... F02G/1/057 |
| JP | 02091463 | 3/1990 | |
| JP | 07151402 | 6/1995 | |
| JP | 07293334 A * | 11/1995 | ........... F02G/1/057 |
| WO | WO 91/05949 | 5/1991 | |

OTHER PUBLICATIONS

Hargreaves, "The Regenerator", *The Philips Stirling Engine*, 1991.

International Search Report, PCT/US01/40200, dtd. Nov. 8, 2001.

* cited by examiner

Primary Examiner—Allen Flanigan
(74) Attorney, Agent, or Firm—Bromberg & Sunstein LLP

(57) ABSTRACT

A regenerator for a thermal cycle engine and methods for its manufacture. The regenerator has a random network of fibers formed to fill a specified volume and a material for cross-linking the fibers at points of close contact between fibers of the network. A method for manufacturing a regenerator has steps of providing a length of knitted metal tape and wrapping a plurality of layers of the tape in an annular spiral.

5 Claims, 5 Drawing Sheets

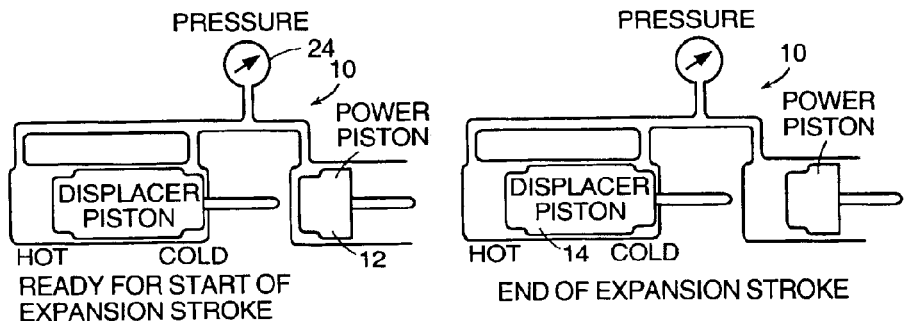
FIG. 1c PRIOR ART
FIG. 1d PRIOR ART
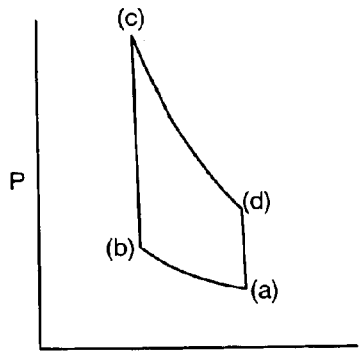
FIG. 1e PRIOR ART
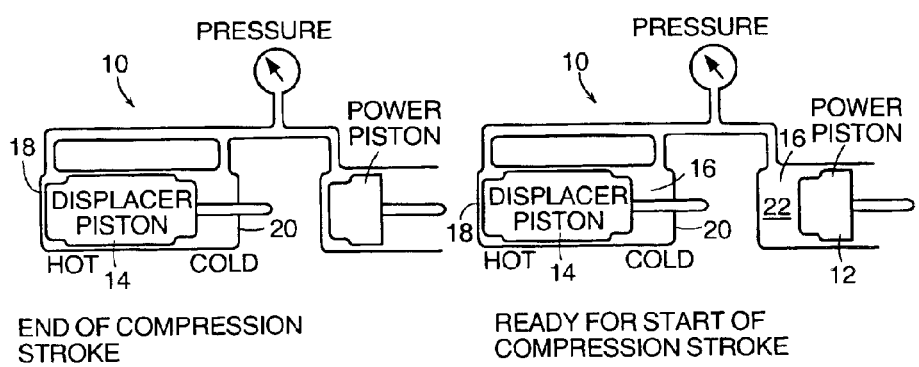
FIG. 1b PRIOR ART
FIG. 1a PRIOR ART

FIG. 3a1

REGENERATOR FOR A STIRLING ENGINE

The present application is a divisional of U.S. application Ser. No. 09/818,321, filed Mar. 27, 2001 now U.S. Pat. No. 6,591,609, which is a continuation-in-part of U.S. application Ser. No. 09/517,245, filed Mar. 2, 2000 now U.S. Pat. No. 6,381,958, which is a continuation-in-part application of U.S. application Ser. No. 09/115,383, filed Jul. 14, 1998, and issued May 16, 2000 as U.S. Pat. No. 6,062,023, and a continuation-in-part also of Ser. No. 09/115,381, filed Jul. 14, 1998 and now abandoned, each of which claims priority from U.S. provisional application No. 60/052,535, filed Jul. 15, 1997, all of which applications are herein incorporated by reference.

TECHNICAL FIELD

The present invention pertains to regenerators for a Stirling cycle heat engine and their manufacture.

BACKGROUND OF THE INVENTION

Stirling cycle machines, including engines and refrigerators, have a long technological heritage, described in detail in Walker, *Stirling Engines*, Oxford University Press (1980), incorporated herein by reference. The principle underlying the Stirling cycle engine is the mechanical realization of the Stirling thermodynamic cycle: isovolumetric heating of a gas within a cylinder, isothermal expansion of the gas (during which work is performed by driving a piston), isovolumetric cooling, and isothermal compression.

Additional background regarding aspects of Stirling cycle machines and improvements thereto are discussed in Hargreaves, *The Phillips Stirling Engine* (Elsevier, Amsterdam, 1991) and in co-pending U.S. patent applications Ser. No. 09/115,383, filed Jul. 14, 1998, and Ser. No. 09/115,381, filed Jul. 14, 1998, which reference and both of which applications are herein incorporated by reference.

The principle of operation of a Stirling engine is readily described with reference to FIGS. 1a–1e, wherein identical numerals are used to identify the same or similar parts. Many mechanical layouts of Stirling cycle machines are known in the art, and the particular Stirling engine designated generally by numeral 10 is shown merely for illustrative purposes. In FIGS. 1a to 1d, piston 12 and a displacer 14 move in phased reciprocating motion within cylinders 16 which, in some embodiments of the Stirling engine, may be a single cylinder. A working fluid contained within cylinders 16 is constrained by seals from escaping around piston 12 and displacer 14. The working fluid is chosen for its thermodynamic properties, as discussed in the description below, and is typically helium at a pressure of several atmospheres. The position of displacer 14 governs whether the working fluid is in contact with hot interface 18 or cold interface 20, corresponding, respectively, to the interfaces at which heat is supplied to and extracted from the working fluid. The supply and extraction of heat is discussed in further detail below. The volume of working fluid governed by the position of the piston 12 is referred to as compression space 22.

During the first phase of the engine cycle, the starting condition of which is depicted in FIG. 1a, piston 12 compresses the fluid in compression space 22. The compression occurs at a substantially constant temperature because heat is extracted from the fluid to the ambient environment. The condition of engine 10 after compression is depicted in FIG. 1b. During the second phase of the cycle, displacer 14 moves in the direction of cold interface 20, with the working fluid displaced from the region of cold interface 20 to the region of hot interface 18. This phase may be referred to as the transfer phase. At the end of the transfer phase, the fluid is at a higher pressure since the working fluid has been heated at constant volume. The increased pressure is depicted symbolically in FIG. 1c by the reading of pressure gauge 24.

During the third phase (the expansion stroke) of the engine cycle, the volume of compression space 22 increases as heat is drawn in from outside engine 10, thereby converting heat to work. In practice, heat is provided to the fluid by means of a heater head 100 (shown in FIG. 2) which is discussed in greater detail in the description below. At the end of the expansion phase, compression space 22 is full of cold fluid, as depicted in FIG. 1d. During the fourth phase of the engine cycle, fluid is transferred from the region of hot interface 18 to the region of cold interface 20 by motion of displacer 14 in the opposing sense. At the end of this second transfer phase, the fluid fills compression space 22 and cold interface 20, as depicted in FIG. 1a, and is ready for a repetition of the compression phase. The Stirling cycle is depicted in a P-V (pressure-volume) diagram as shown in FIG. 1e.

Additionally, on passing from the region of hot interface 18 to the region of cold interface 20, the fluid may pass through a regenerator 134 (shown in FIG. 2). Regenerator 134 is a matrix of material having a large ratio of surface area to volume which serves to absorb heat from the fluid when it enters hot from the region of hot interface 18 and to heat the fluid when it passes from the region of cold interface 20.

Stirling cycle engines have not generally been used in practical applications due to such practical considerations as efficiency, lifetime, and cost, which are addressed by the instant invention.

SUMMARY OF THE INVENTION

In accordance with preferred embodiments of the present invention, a method is provided for manufacturing a regenerator for a thermal cycle engine. The method includes wrapping a plurality of layers of knitted metal tape in an annular spiral. The knitted metal tape may be wrapped in parallel annular layers around a mandrel and then the mandrel may be removed. Additionally, the knitted metal tape may be flattened.

In accordance with alternate embodiments of the invention, a method for manufacturing a regenerator for a thermal cycle engine is provided that includes axially compressing a length of knitted metal tube along the tube axis thereby generating a bellows.

In further embodiments of the invention, a regenerator is provided for a thermal cycle engine. The regenerator has a random network of fibers formed to fill a specified volume and a material for cross-linking the fibers at points of close contact between fibers of the network. The fibers may be metal, or, more particularly, steel wool. The material for cross-linking the fibers may be nickel. The fibers may also be silica glass and the material for cross-linking the fibers may be tetraethylorthosilicate.

In yet further embodiments of the invention, a regenerator is provided for a thermal cycle engine, where the regenerator has a volume defined by an inner sleeve and an outer sleeve, the inner and outer sleeves being substantially concentric, and two parallel planes, each substantially perpendicular to each of the inner and outer sleeves. The regenerator also has a random network of fibers contained within the volume, and two screens, each coupled to both the inner and outer sleeves and lying in one of the two parallel planes, such as to contain the random network of fibers within the volume.

A regenerator for a thermal cycle engine may be manufactured, in accordance with other embodiments of the invention, by filling a form with a random network of electrically conducting fibers, immersing the form in an electroplating solution, and applying a current between the solution and the random network of fibers in such a manner as to deposit a material for cross-linking the electrically conducting fibers at points of close contact between fibers. Alternatively, a form may be filled with a random network of fibers, whereupon the random network of fibers is sintered in such a manner as to cross-link the fibers at points of close contact between fibers.

A further method for manufacturing a regenerator for a thermal cycle engine, in accordance with embodiments of the invention, includes the steps of forming a reticulated foam into a specified shape, depositing a ceramic slurry onto the reticulated foam, heat treating the slurry in such a manner as to burn off the foam, and sintering the ceramic.

BRIEF DESCRIPTION OF THE DRAWINGS

The invention will be more readily understood by reference to the following description, taken with the accompanying drawings, in which:

FIGS. 1a–1e depict the principle of operation of a prior art Stirling cycle machine;

DETAILED DESCRIPTION OF PREFERRED EMBODIMENTS

Figure 2:
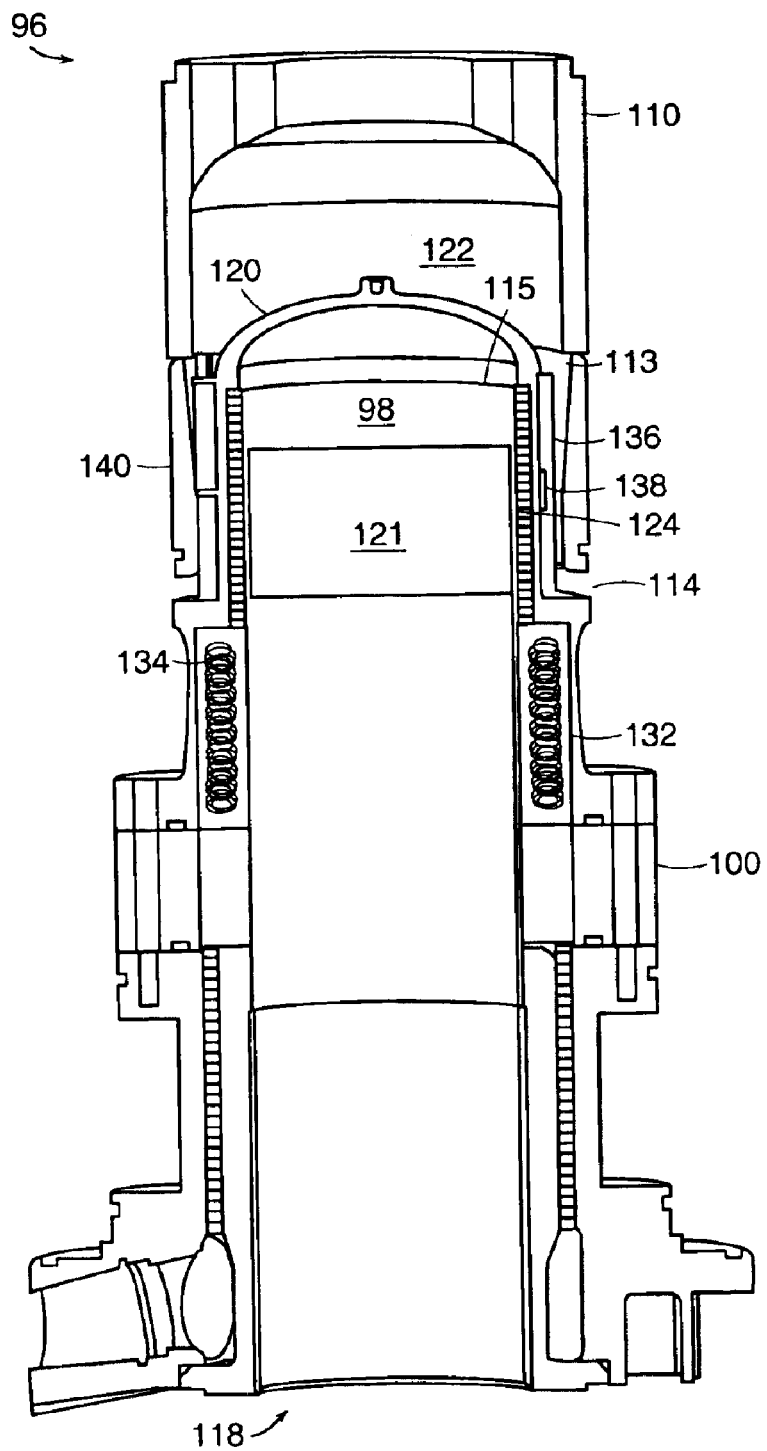
FIG. 2 shows a side view in cross section of the heater head and combustion chamber of a thermal engine in accordance with a preferred embodiment of the present invention.

Referring to FIG. 2, a cross-sectional view is shown of the expansion volume 98 of a thermal cycle engine, shown for illustrative purposes as a Stirling cycle engine designated generally by numeral 96, and of the corresponding thermal control structures. Heater head 100 is substantially a cylinder having one closed end 120 (otherwise referred to as the cylinder head) and an open end 118. Closed end 120 is disposed in a combustion chamber 122 defined by an inner combustor structure 110. Hot combustion gases in combustion chamber 122 are in direct thermal contact with heater head 100 and thermal energy is transferred by conduction from the combustion gases to the heater head and from the heater head to the working fluid of the thermal engine, typically helium. Other gases such as nitrogen, for example, may be used within the scope of the present invention, with a preferable working fluid having high thermal conductivity and low viscosity. Non-combustible gases are also preferred. Heat is transferred from the combustion gases to the heater head as the combustion gases flow along the outside surface of closed end 120 within a gas flow channel 113.

Expansion volume 98 is surrounded on its sides by expansion cylinder liner 115, disposed, in turn, inside heater head 100 and typically supported by the heater head. The expansion piston 121 travels along the interior of expansion cylinder liner 115. As the expansion piston travels toward closed end 120 of heater head 100, the working fluid within the heater head is displaced and caused to flow through flow channels defined by the outer surface of the expansion cylinder liner 115 and the inner surface of heater head 100.

As the working fluid is displaced from expansion cylinder 115 by the expansion piston, working fluid is further heated in passage over the inner pin array 124 and driven through regenerator chamber 132. A regenerator 134 is used in a Stirling cycle machine, as discussed above, to add and remove heat from the working fluid during different phases of the Stirling cycle. The regenerator used in a Stirling cycle machine must be capable of high heat transfer rates which typically suggests a high heat transfer area and low flow resistance to the working fluid. Low flow resistance also contributes to the overall efficiency of the engine by reducing the energy required to pump the working fluid. Additionally, regenerator 134 must be fabricated in such a manner as to resist spalling or fragmentation because fragments may be entrained in the working fluid and transported to the compression or expansion cylinders and result in damage to the piston seals.

One regenerator design uses several hundred stacked metal screens While exhibiting a high heat transfer surface, low flow resistance and low spalling, metal screens may suffer the disadvantage that their cutting and handling may generate small metal fragments that must be removed before assembling the regenerator. Additionally, stainless steel woven wire mesh contributes appreciably to the cost of the Stirling cycle engine.

Figure 3A:
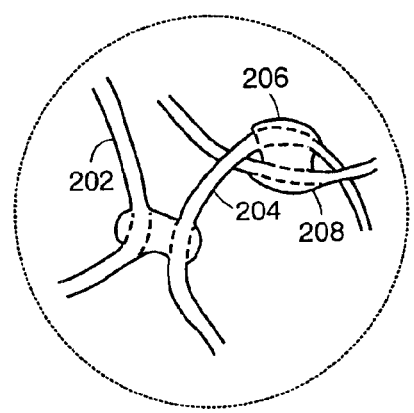
FIG. 3a depicts the fabrication of a regenerator by electroplating of a fibrilose starting material in accordance with an embodiment of the present invention.
Figure 3A:
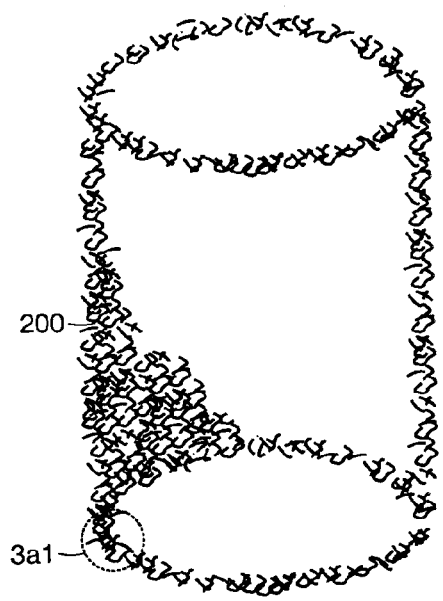

In accordance with an embodiment of the invention, a three dimensional random fiber network, such as stainless steel wool or ceramic fiber, for example, may be used as the regenerator, as now described with reference to FIG. 3a. Stainless steel wool regenerator 200 advantageously provides a large surface area to volume ratio, thereby providing favorable heat transfer rates at low fluid flow friction in a compact form. Additionally, cumbersome manufacturing steps of cutting, cleaning and assembling large numbers of screens are advantageously eliminated. The low mechanical strength of steel wool and the tendency of steel wool to spall may both be overcome as now described. In accordance with an embodiment of the invention, the individual steel wires 202, 204 are "cross-linked" into a unitary 3D wire matrix.

Figure 3B:
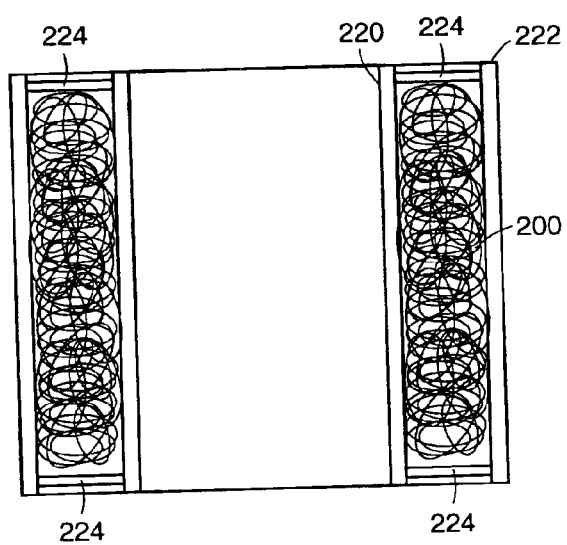
FIG. 3b is a cross-sectional of the regenerator chamber of a Stirling cycle engine in accordance with the present invention.

The starting material for the regenerator may be fibrilose and of random fiber form such as either steel or nickel wool. The composition of the fiber may be a glass or a ceramic or a metal such as steel, copper, or other high temperature materials. The diameter of the fiber is preferably in the range from 10 micrometers to 1 millimeter depending on the size of the regenerator and the properties of the metal. The starting material is placed into a form corresponding to the final shape of the regenerator which is depicted in cross-section in FIG. 3b. Inner canister cylindrical wall 220, outer canister cylindrical wall 222, and regenerator network 200 are shown. The density of the regenerator is controlled by the amount of starting material placed in the form. The form may be porous to allow fluids to pass through the form.

In an alternate embodiment of the invention, unsintered steel wool is employed as regenerator network 200. Regenerator network 200 is then retained within the regenerator canister by regenerator retaining screens 224 or other filter, thereby comprising a "basket" which may advantageously capture steel wool fragments.

In one embodiment of the invention, applicable to starting material that is electrically conducting, the starting material is placed in a porous form and placed in an electrolyte bath.

The starting material may be a metal, such as stainless steel, for example. An electrical connection is made with the starting material thereby forming an electrode. Cross-linking of the individual fibers in the starting material is accomplished by electrically depositing a second material 206 onto the starting material. The selection of the starting material will depend on such factors as the particular deposition technique chosen and the chemical compatibility of the first and second materials, as known to one of ordinary skill in the electrochemical art. During deposition, the second material will build up on the starting material and form bridges 208 between the individual fibers of the starting material in places where the individual fibers are in close proximity to each other. The deposition is continued until the bridges have grown to a sufficient size to hold the two individual fibers rigidly in place.

The deposition duration depends on the particular deposition process and is easily determined by one of ordinary skill in the art. After the deposition is completed, the regenerator is removed from the bath and the form and is cleaned.

In another embodiment of the invention, the starting material is placed in a form that may be porous or not. The form containing the starting material is placed in a furnace and is partially sintered into a unitary piece. The selection of the sintering temperature and sintering time is easily determined by one of ordinary skill in the sintering art.

In another embodiment of the invention, the starting material is placed in a porous form. The form containing the starting material is placed in a chemical bath and a second material, such as nickel, is chemically deposited to form bridges between the individual fibers.

In another embodiment of the invention, the starting material is a silica glass fiber which is placed into a porous form. The glass fiber and form is dipped in a solution of tetraethylorthosilicate (TEOS) and ethanol so that the fiber is completely wetted by the solution. The fiber and form are removed from the solution and allowed to drain in a humid atmosphere. The solution will form meniscoidal shapes bridging fibers in close proximity to each other. The humidity of the atmosphere will start the hydrolysis-condensation reaction that converts the TEOS to silica forming a cross link between the two fibers. The fiber and form may be heat treated at a temperature less than 1000° C., most preferably less than 600° C., to remove the reactant products and form a silica bridge between the fibers.

In another embodiment of the invention, a ceramic slurry is deposited onto a reticulated foam having the shape of the regenerator. The slurry is dried on the reticulated foam and heat treated to burn off the foam and sinter the ceramic. The ceramic may be composed of an oxide ceramic such as cordierite, alumina, or zirconia. The composition of the ceramic slurry and the heat treatment profile is easily specified by one of ordinary skill in the ceramic processing art.

Figure 4A:
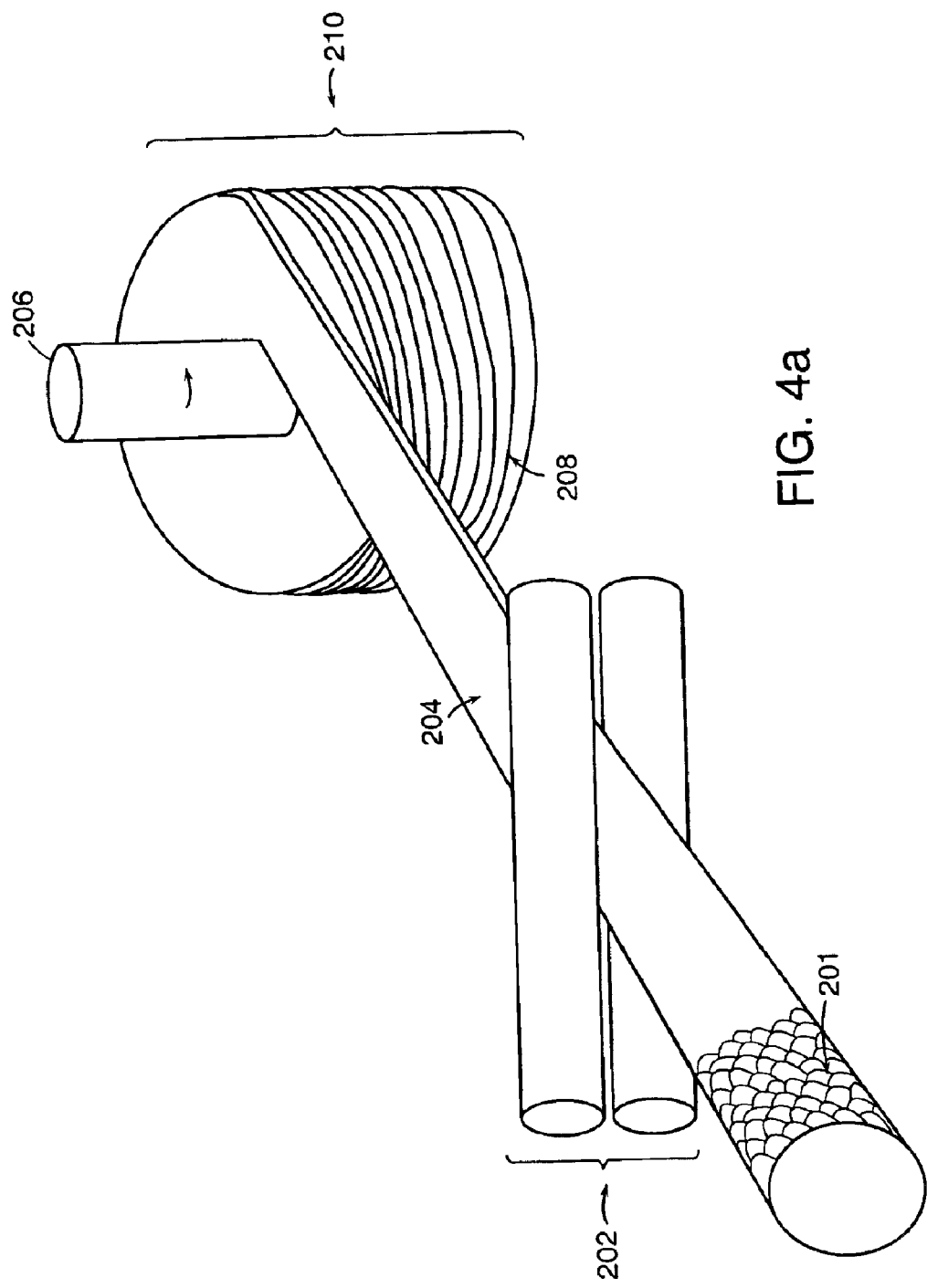
FIG. 4a depicts fabricating a knit-wire wound regenerator in accordance with embodiments of the present invention.

In yet other embodiments of the invention, knit or woven wire is employed in fabrication of a regenerator as now described with reference to FIG. 4a. In accordance with these embodiments, knit or woven wire tube 201 is flattened by rollers 202 into tape 204, in which form it is wound about mandrel 206 into annular layers 208. Stainless steel is advantageously used for knit wire tube 201 because of its ability to withstand elevated temperature operation, and the diameter of the wire used is typically in the range of 1–2 mils, however other materials and gauges may be used within the scope of the present invention. Alternatively, a plurality, typically 5–10, of the stainless steel wires may be loosely wound into a multi-filament thread prior to knitting into a wire tube. This process advantageously strengthens the resulting tube 201. When mandrel 206 is removed, annular assembly 210 may be used as a regenerator in a thermal cycle engine.

Figure 4B:
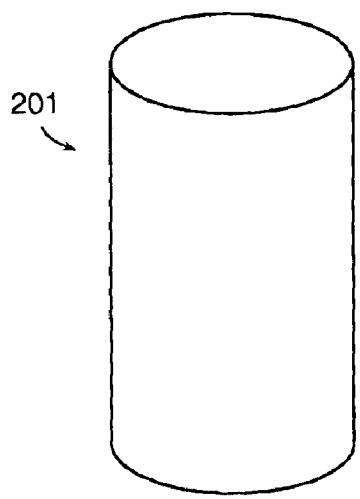
FIG. 4b is a knit-wire tube prior to fabrication into a bellows configuration.
Figure 4C:
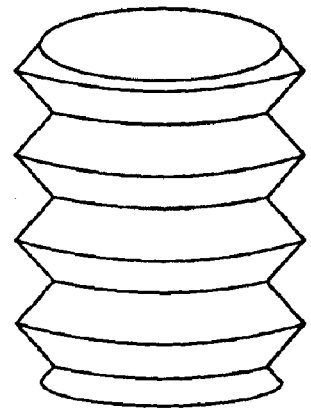
FIG. 4c shows the knit-wire tube of FIG. 4a scored for compression in accordance with an embodiment of the invention.
Figure 4D:
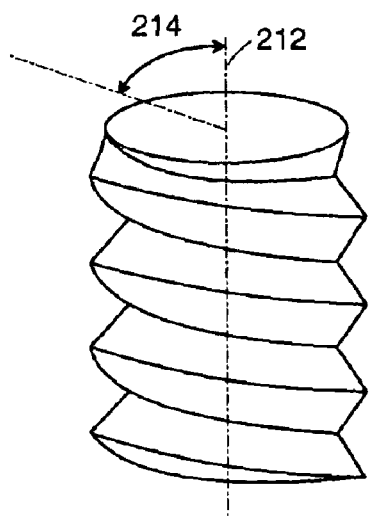
FIG. 4d shows the knit-wire tube of FIG. 4a scored in an alternative manner for compression in accordance with an embodiment of the invention.
Figure 4E:
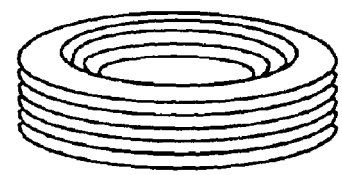
FIG. 4e shows the knit-wire tube of FIG. 4a after compression to form a bellows regenerator in accordance with an embodiment of the invention.

Still another embodiment of the invention is now described with reference to FIGS. 4b–4e. Knit or woven wire tube 201, shown in its right cylindrical form in FIG. 4b, is shown scored and partially compressed in FIG. 4c. Alternatively, the scoring may be at an angle 214 with respect to the central axis 212 of the tube, as shown in FIG. 4d. Tube 201 is then axially compressed along central axis 212 to form the bellows form 216 shown in FIG. 4e that is then disposed as a regenerator within the regenerator volume 132 (shown in FIG. 2) of a Stirling cycle engine.

The devices and methods described herein may be applied in other applications besides the Stirling engine in terms of which the invention has been described. The described embodiments of the invention are intended to be merely exemplary and numerous variations and modifications will be apparent to those skilled in the art. All such variations and modifications are intended to be within the scope of the present invention as defined in the appended claims.

We claim:

1. A regenerator for a thermal cycle engine, the regenerator comprising:
    a. a random network of fibers formed to fill a specified volume; and
    b. a material for bonding the fibers at points of close contact between fibers of the network
    wherein the fibers are silica glass and the material for bonding the fibers is tetraethylorthosilicate.

2. In a thermal cycle engine comprising a warmer section and a cooler section and a working fluid recycling between the sections, an improvement comprising a regenerator through which the working fluid flows, the regenerator comprising:
    a. a volume defined by an inner sleeve and an outer sleeve, the inner and outer sleeves being substantially concentric, and two parallel planes, each substantially perpendicular to each of the inner and outer sleeves;
    b. a random network of fibers contained within the volume; and
    c. a first and a second screen, each screen coupled to both the inner and outer sleeves and lying in one of the two parallel planes, such as to contain the random network of fibers within the volume.

3. A regenerator according to claim 2, wherein the fibers are chosen from the group of steel and nickel wool.

4. A thermal cycle engine comprising a warmer section and a cooler section and a working fluid recycling between the sections, an improvement comprising a regenerator through which the working fluid flows, the regenerator comprising:
    a. a random network of fibers formed to fill an annular volume; and
    b. a filter disposed at at least one end of the annular volume for retaining fragments within the annular volume.

5. A regenerator according to claim 4, wherein the filter is a screen.

* * * * *